United States Patent [19]

Porte et al.

[11] Patent Number: 4,694,060

[45] Date of Patent: Sep. 15, 1987

[54] PROCESS FOR THE TREATMENT OF POLYORGANOSILAZANES AND/OR OF POLYORGANO(DISILYL)SILAZANES BY MEANS OF A TREATMENT OF POLYORGANOSILAZANES WITH A CATALYST SYSTEM COMPRISING AN IONIC INORGANIC SALT AND A COMPLEXING COMPOUND

[75] Inventors: Huques Porte, Lyons; Jean-Jacques Lebrun, Caluire, both of France

[73] Assignee: Rhone-Poulenc Specialites Chimiques, France

[21] Appl. No.: 860,038

[22] Filed: May 6, 1986

[30] Foreign Application Priority Data

May 6, 1985 [FR] France ................................ 85 06828

[51] Int. Cl.$^4$ .............................................. C08G 77/06
[52] U.S. Cl. ........................................ 528/14; 528/21; 528/23; 528/25; 528/27; 528/28; 556/412; 525/474; 525/475
[58] Field of Search .................. 525/474, 475; 528/27, 528/28, 25, 14, 21, 23; 556/412

[56] References Cited

U.S. PATENT DOCUMENTS

| | | | |
|---|---|---|---|
| 3,007,886 | 11/1961 | Parker | 260/18 |
| 3,143,514 | 8/1964 | Boyer | 260/2 |
| 3,187,030 | 6/1965 | Boyer et al. | 260/448.2 |
| 3,853,567 | 12/1974 | Verbeek | 106/44 |
| 4,308,366 | 12/1981 | Millet | 525/474 |
| 4,482,669 | 11/1984 | Seyferth et al. | 525/474 |
| 4,482,689 | 11/1984 | Halliska | 528/25 |
| 4,535,007 | 8/1985 | Cannady | 525/474 |

OTHER PUBLICATIONS

69 Chemical Abstracts, No. 24, p. 9130, 97256y.
EPO Search Report, EP 86 42 0113, dated 8/19/86.
English Language Translation of Japanese Patent Specification No. 54-93100, filed Dec. 29, 1977.

*Primary Examiner*—Melvyn I. Marquis
*Attorney, Agent, or Firm*—Finnegan, Henderson, Farabow, Garrett & Dunner

[57] ABSTRACT

A process for the treatment of polyorganosilazanes and/or polyorgano(disilyl)silazanes with an effective quantity of a catalyst system comprising (i) an ionic inorganic salt of the formula $M^{3O}A^-$, and (II) a compound capable of complexing with the cation $M^+$ of the salt. The $M^+$ cation is a metal ion or a quaternary ammonium ion, and $A^-$ is a compatible anion.

The polysilazanes are selected from organopolysilazanes and organopoly(disilyl)silazanes. When treated in this manner, the polysilazanes are characterized by good thermal behavior and can, in particular, be used, after pyrolysis, as precursors of ceramic products.

25 Claims, No Drawings

PROCESS FOR THE TREATMENT OF POLYORGANOSILAZANES AND/OR OF POLYORGANO(DISILYL)SILAZANES BY MEANS OF A TREATMENT OF POLYORGANOSILAZANES WITH A CATALYST SYSTEM COMPRISING AN IONIC INORGANIC SALT AND A COMPLEXING COMPOUND

BACKGROUND OF THE INVENTION

The present invention relates to a process for the catalytic treatment of polysilazanes and, more particularly, to the catalytic treatment of polyorganosilazanes and/or polyorgano(disilyl) silazanes with a catalyst system comprising an ionic inorganic salt and a complexing compound.

Organopolysilazanes are well-known products that occur in the form of monomers, oligomers, ring or linear polymers, and resinous polymers. These organopolysilazanes can be prepared using a wide variety of methods from a wide range of starting materials.

These organopolysilazanes can be, in particular, shaped and pyrolyzed in the form of $Si_3N_4$, SiC or their mixtures. Silicon nitride can also be prepared by the reaction of chlorosilanes, such as $SiCl_4$, $HSiCl_3$ and $H_2SiCl_2$, with ammonia at a high temperature and in a vapor phase. It is difficult to manufacture shaped articles, especially fibers, using this method because it directly yields a powdered product. In contrast, organopolysilazanes can also be spun into continuous fibers, the pyrolysis of which yields ceramic fibers.

Organopolysilazanes can also be shaped into films of various gauges and into massive molded articles. The organopolysilazanes can be used as binders for ceramic fiber or carbon fiber, and can also be used as sintering binders for porous ceramic articles.

However, difficulties are encountered in converting these organopolysilazanes readily and economically into a form of fibers or coatings that, after pyrolysis, yield ceramic products in the form of fibers, films, coatings of various gauges, and molded articles.

An attempt to solve this problem was made in U.S. Pat. No. 3,853,567. This patent discloses a process for the manufacture of shaped articles such as fibers comprising silicon carbide, silicon nitride or mixtures thereof with other ceramic products by first performing a thermal treatment of an organopolysilazane at a temperature between 200° C. and 800° C. The process obtains a meltable carbosilazane resin that can be melt-spun and then pyrolyzed at a temperature between 800° C. and 2000° C.

Although U.S. Pat. No. 3,853,567 represents a significant step forward, it has two disadvantages. First, it requires the thermal treatment to be conducted at a high temperature, such as 200° C.–800° C. Secondly, it requires working with a carbosilazane in melt form under anhydrous conditions and in an inert atmosphere. In addition, the weight yield of the ceramic is inadequate.

Japanese Patent Application Kokai No. 77/160,446 describes a process for the polymerization of organopolysilazanes of high molecular weight while using acidic earths as catalysts for the treatment of the organopolysilazanes. However, this process has the major disadvantage of requiring the solid catalyst to be separated off by filtration. This implies the use of a solvent for polymers that can reach high viscosities.

SUMMARY OF THE INVENTION

The objective of the present invention is to solve the above problems and provide a simple, effective, economical and readily usable means for treating organopolysilazanes so that, when pyrolyzed at a temperature between 1,000° C. and 2,000° C., the treated organo polysilazanes yield ceramic products of excellent properties. The ceramic properties can be in a wide variety of forms such as filaments, molded articles, coatings, films, and the like.

Moreover, it is also desirable to have readily available an organopolysilazane that is sufficiently stable to hydrolysis and that yields a ceramic material in a high weight yield when pyrolyzed. For this purpose, it is intended that the organopolysilazane exhibits good thermal behavior during pyrolysis, while remaining integrally attached to the substrate to be coated and impregnated.

These and other objectives are obtained by the present invention that provides a process for the treatment of a polysilazane. The process catalytically treats at least one polysilazane selected from the group consisting of an organopolysilazane, an organopoly(disilyl)silazane, and a mixture thereof with a catalytically effective amount of a catalyst system. The polysilazane is free from any hydrogen atom bonded directly to the silicon atoms and the organic radicals bonded to the silicon atoms in the polysilazane are hydrocarbon radicals. The catalyst system contains an ionic inorganic salt of the formula $M^+A^-$ and a compound capable of complexing with the cation $M^+$ of the salt. The $M^+$ ion is a metal ion or a quaternary ammonium ion, and the $A^-$ ion is an anion compatible with the $M^+$ ion.

The above and other features and advantages of the present invention will be made more apparent from the following description of the preferred embodiment.

DETAILED DESCRIPTION OF THE PREFERRED EMBODIMENT

The present invention provides a process for the catalytic treatment of a polysilazane that is an organopolysilazane, an organopoly(disilyl)silazane, or a mixture thereof. The polysilazane is free from any hydrogen atoms bonded directly to the silicon atoms and the organic radicals bonded to the silicon atoms in the polysilazane are hydrocarbon radicals. The polysilazane is treated with a catalyst system comprising (i) an ionic inorganic salt of the formula $M^+ A^-$, and (ii) a compound capable of complexing with the cation $M^+$ of the salt.

As an organopolysilazane, there may be used any product of the reaction of (a) at least one organohalosilane of the formula I:

$$R_aX_{4-a}Si \tag{I}$$

wherein the radicals R, which are identical or different, are chosen from a linear or branched, optionally halogenated, alkyl radical containing from 1 to 12 carbon atoms; a cycloalkyl radical containing from 5 to 7 carbon atoms; an aryl radical such as the phenyl and naphthyl radical; or an arylalkyl or alkylaryl radical whose linear or branched alkyl moiety contains from 1 to 6 carbon atoms with the radicals R being other than the hydrogen atom; and a is 0, 1, 2 or 3, with (b) an organic or organosilicon compound containing at least one $NH_2$ or NH group such as, for example, ammonia, primary or secondary amines, silylamines, amides, hydrazines, hydrazides, and the like.

Examples of alkyl radicals R in the formula (I) are methyl, ethyl, propyl, butyl, pentyl, hexyl, heptyl and octyl radicals. Examples of cycloalkyl radicals R include cyclopentyl, cyclohexyl and cycloheptyl radicals. The arylalkyl radicals R may be benzyl and phenylethyl radicals. As alkylaryl radicals, R may be the tolyl and xylyl radicals. As alkenyl radicals, R may be the vinyl and allyl radicals. As alkynyl radicals, R may be ethynyl and propynyl radicals. In Formula I, X is a halogen, prefereably a chlorine atom.

The organohalosilane can be one of the following used by itself or in a mixture:
$(CH_3)_2SiCl_2$, $(CH_3)_3SiCl$, $CH_3SiCl_3$, $SiCl_4$, $(CH_3)_2Si(CH_2Cl)_2$, $(CH_3)_3SiCH_2Cl$, $CH_3Si(CH_2Cl)_3$, $(C_6H_5)_2SiCl_2$, $(C_6H_5)(CH_3)SiCl_2$, $C_6H_5SiCl_3$, $(CH_3)(CH_3CH_2)SiCl_2$, $(CH_3)(CH_2=CH)SiCl_2$, $(CH_3)_2(CH_2=CH)SiCl$, $(C_6H_5)_2(CH_2=CH)SiCl$, $(C_6H_5)(CH_2=CH)SiCl_2$, and $CH_3(C_6H_5)(CH_2=CH)SiCl$.

The polysilazanes of the present invention are well known and can be readily prepared by one skilled in the art. More specifically, they may be chosen from polysilazanes of formulae II to IV defined below.

Linear polysilazane polymers may correspond to the formulae II and III:

$$H_2N(R_2SiNH)_p SiR_2 NH_2 \quad (II)$$

and $$R_3SiNH(R_2SiNH)_{p'} SiR_3 \quad (III)$$

wherein R has the same meaning given in Formula I; p and p' are integers which are from 1 to 1,000, preferably from 3 to 300.

The polymers of formula (II) may be prepared by bringing diorganodichlorosilanes into contact with ammonia. The polymers of formula (III) may be prepared by the reaction of ammonia with a triorganochlorosilane or a mixture of diorganodichlorosilane and triorganochlorosilane. For example, see French Patent FR-A No. 1,086,932 and U.S. Pat. No. 2,564,674.

In general, the reaction of an organohalosilane with an organic amine is described in U.S. Pat. Nos. 3,853,567 and 3,892,583. The reaction of an organohalosilane with a disilazane is described in Belgian Patent No. BE-A-888,787.

Cyclic polysilazane polymers may correspond to formula IV:

$$(R_2SiNH)_n \quad (IV)$$

wherein n is from 3 to 10, preferably n=3.4 and R has the meaning given for the above formula (I). These cyclic polymers are described, in particular, in British Patent No. GB-A-881,178.

Resinous polysilazane polymers can consist of units chosen from those of the formulae: $R_3SiNH_{0.5}$, $R_2SiNH$, $RSiNH_{1.5}$ and $Si(NH)_2$. These resinous polymers are advantageously prepared by bringing the corresponding organochlorosilanes or mixtures of these silanes into contact with ammonia, preferably in an organic solvent medium. For example, see French Patent Nos. FR-A-1,379,243; FR-A-1,392,853; and FR-A-1,393,728.

These resinous polymers contain a predominant number of Si—NH—Si bonds and a smaller number of SiNH$_2$ bonds. In addition to the crosslinked polymers, they occasionally contain linear and cyclic polymers. The cyclic polymers are formed only when diorganodichlorosilanes are present among the starting organochlorosilanes.

Organopoly(disilyl)silazanes may be prepared by the reaction of (a) an organic or organosilicon compound containing at least one NH$_2$ or NH group, such as, for example, ammonia, primary or secondary amines, silylamines, amides, hydrazines and hydrazides, and the like, with (b) at least one organohalodisilane of the formula V:

$$R_b X_{3-b} Si Si R_c X_{3-c} \quad (V)$$

wherein the radicals R, which may be identical or different, have the same meaning as above; b is equal to 0, 1, 2 or 3; c is equal to 0, 1 or 2; and X is a halogen, preferably chlorine.

Examples of compounds of formula (V) include: $(CH_3)_2ClSiSi(CH_3)_2Cl$, $(CH_3)_2ClSiSiCH_3Cl_2$, and $CH_3Cl_2SiSiCH_3Cl_2$.

The following compounds contain at least one NH$_2$ or NH group and can be used in the synthesis of the above polysilazanes: ammonia, methylamine, dimethylamine, ethylamine, cyclopropylamine, hydrazine, methylhydrazine, ethylenediamine, tetramethylenediamine, hexamethylenediamine, aniline, methylaniline, diphenylamine, toluidine, guanidine, aminoguanidine, urea, hexamethyldisilazane, diphenyltetramethyldisilazane; tetraphenyldimethyldisilazane, tetramethyldivinyldisilazane; dimethyldiphenyldivinyldisilazane; and tetramethyldisilazane.

The reaction of a halodisilane with ammonia, in the presence of a halosilane, if appropriate, is described in European Patent No. EP-A 75,826. The reaction of a halodisilane with a disilazane is described in French Patent No. FR-A 2,497,812. All the above documents concerning the preparation of polysilazanes are incorporated specifically by reference herein.

As described in patent No. EP-A 75,826, organopoly[(disilyl)silazanes-silazanes] can be prepared by the reaction of the amino derivatives referred to above with mixtures of halogenated products of formula (I) and (V).

The starting polysilazanes prepared from ammonia are generally referred to as ammonolysates. The starting polysilazanes prepared from an amino compound are referred to as aminolysates, which include ammonolysates.

Furthermore, in the aminolysates of the polysilazane type, the following units can be distinguished:

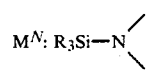

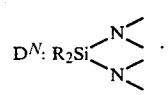

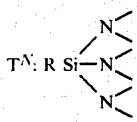

The ionic inorganic salts of formula $M^+A^-$ employed as the catalytic system in the present invention have a metal or a quaternary ammonium ion as the $M^+$ ion and a compatible anion as the $A^-$ ion. In particular, $M^+$ denotes an alkali metal, an alkaline-earth metal, or a quaternary ammonium ion. Preferably, $M^+$ is selected from $Li^+$, $Na^+$, $K^+$, $Ca^{++}$, or $NH_4+$. Preferably, $A^-$ is selected from a halogen, $SCN^-$, $CN^-$, or $CO_3—$. Preferably, $A^-$ is $F^-$, $Cl^-$, $Br^-$, $I^-$.

According to a particular embodiment of the invention, the compound complexing the cation of the ionic inorganic salt is a sequestering agent of formula VI:

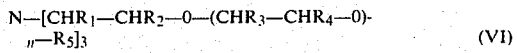
(VI)

In Formula VI n is an integer from 0 to 10 inclusive; $R_1$, $R_2$, $R_3$ and $R_4$, which are identical or different, are chosen from a hydrogen atom and a $C_1-C_4$-alkyl radical; the radicals $R_5$, which are identical or different, are chosen from a hydrogen atom, a $C_1-C_{12}$-alkyl or cycloalkyl radical, and an alkylphenyl or phenylalkyl radical in which the alkyl moiety consists of $C_1-C_{12}$.

Preferably, $R_1$, $R_2$, $R_3$ and $R_4$ in Formula VI denote a hydrogen atom or a methyl radical and at least one of the radicals $R_5$ denotes the hydrogen atom or, when this is absent, a $C_1-C_4$ alkyl radical. In Formula VI, n is preferably an integer from 0 to 6 and, still more preferably, from 0 to 3.

In the remaining text the percentages are by weight, unless stated otherwise.

According to a preferred embodiment of the invention, a sequestering agent of formula (VI) is used, wherein $R_1$, $R_2$, $R_3$ and $R_4$ are a hydrogen atom or a methyl radical, and n is selected from 0 to 6.

Examples of preferred sequestering agents of Formula VI, include the following:
tris(3-oxabutyl)amine of formula: $N(CH_2—CH_2—O—CH_3)_3$
tris(3,6-dioxaheptyl)amine of formula: $N(CH_2—CH_2—O—CH_2—CH_2—O—CH_3)_3$
tris(3,6,9-trioxadecyl)amine of formula: $N(CH_2—CH_2—O—CH_2—CH_2—O—CH_2—CH_2—O—CH_3)_3$
tris(3,6-dioxaoctyl)amine of formula: $N(CH_2—CH_2—O—CH_2—CH_2—O—C_2H_5)_3$
tri(3,6,9-trioxaundecyl)amine of formula: $N(CH_2—CH_2—O—CH_2—CH_2—O—CH_2—CH_2—O—C_2H_5)_3$
tris(3,6-dioxanonyl)amine of formula: $N(CH_2—CH_2—O—CH_2—CH_2—O—C_3H_7)_3$
tris(3,6,9-trioxadodecyl)amine of formula: $N(CH_2—CH_2—O—CH_2—CH_2—O—CH_2—CH_2—O—C_3H_7)_3$
tris(3,6-dioxadecyl)amine of formula: $N(CH_2—CH_2—O—CH_2—CH_2—O—C_4H_9)_3$
tris(3,6,9-trioxatridecyl)amine of formula: $N(CH_2—CH_2—O—CH_2—CH_2—O—CH_2—CH_2—O—C_4H_9)_3$
tris(3,6,9,12-tetraoxatridecyl)amine of formula: $N—(CH_2—CH_2—O(CH_2—CH_2—O)_3—CH_3)_3$
tris(3,6,9,12,15,18-hexaoxanonadecyl)amine of formula: $N—(CH_2—CH_2—O—(CH_2—CH_2—O)_5CH_3)_3$
tris(3,6-dioxa-4-methylheptyl)amine of formula: $N—(CH_2—CH_2—O—CH—(CH_3)—CH_2—O—CH_3)_3$
tris(3,6-dioxa-2,4-dimethylheptyl)amine of formula: $N—(CH_2—CH—(CH_3)—OCH \quad (CH_3)—CH_2—O—CH_3)_3$
triethanolamine: $N(CH_2—CH_2—OH)_3$
tris(3-oxa-5-hydroxypentyl)amine: $N(CH_2—CH_2—O—CH_2—CH_2—OH)_3$
tris(3,6,-dioxa-8-hydroxyoctyl)amine: $N(CH_2—CH_2—O—CH_2—CH_2—OCH_2—OH)_3$
tris(2,4-dimethyl-3-oxahydroxypentyl)amine:

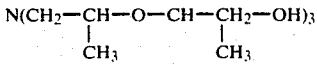

According to a particular embodiment of the invention, sequestering agents grafted onto crosslinked organic polymer substrates are used as complexing compounds. Preferred grafted complexing compounds are those described in European Patent Application No. 46,706. The grafted sequestering agents described in European Patent Application No. 46,706 are characterized in that they consist of a crosslinked organic polymer substrate and of a plurality of functional groups fixed onto the substrate. The grafted sequestering agents can be of the formula VII:

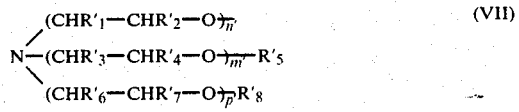
(VII)

In Formula VII, $R'_1$, $R'_2$, $R'_3$, $R'_4$, $R'_6$ and $R'_7$, which are identical different, are chosen from a hydrogen atom and an alkyl radical containing from 1 to 4 carbon atoms; $R'_5$ and $R'_8$, which are identical or different, are chosen from a hydrogen atom, an alkyl or cycloalkyl radical containing from 1 to 12 carbon atoms, a phenyl radical, or an alkylphenyl or phenylalkyl radical in which the alkyl moiety consists of $C_1-C_{12}$; and n', m' and p', which are identical or different, are greater than or equal to 1 and less than or equal to 10.

According to another preferred embodiment of the invention, a supported sequestering agent is used that has a crosslinked organic polymer substrate and a plurality of functional groups fixed onto the substrate. This sequestering agent may be of the formula (VII), in which $R'_1$, $R'_2$, $R'_3$, $R'_4$, $R'_6$ and $R'_7$, which are identical or different, denote a hydrogen atom or a methyl radical; and $R'_5$ and $R'_8$, which are identical or different, denote a hydrogen atom or an alkyl radical consisting of $C_1-C_4$. According to another preferred embodiment of the invention, in Formula VI, n', m' and p', which are identical or different, are greater than or equal to 1 and less than or equal to 6.

Examples of the functional groups which can be fixed onto the substrate include the following:

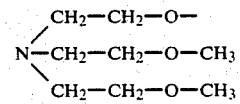

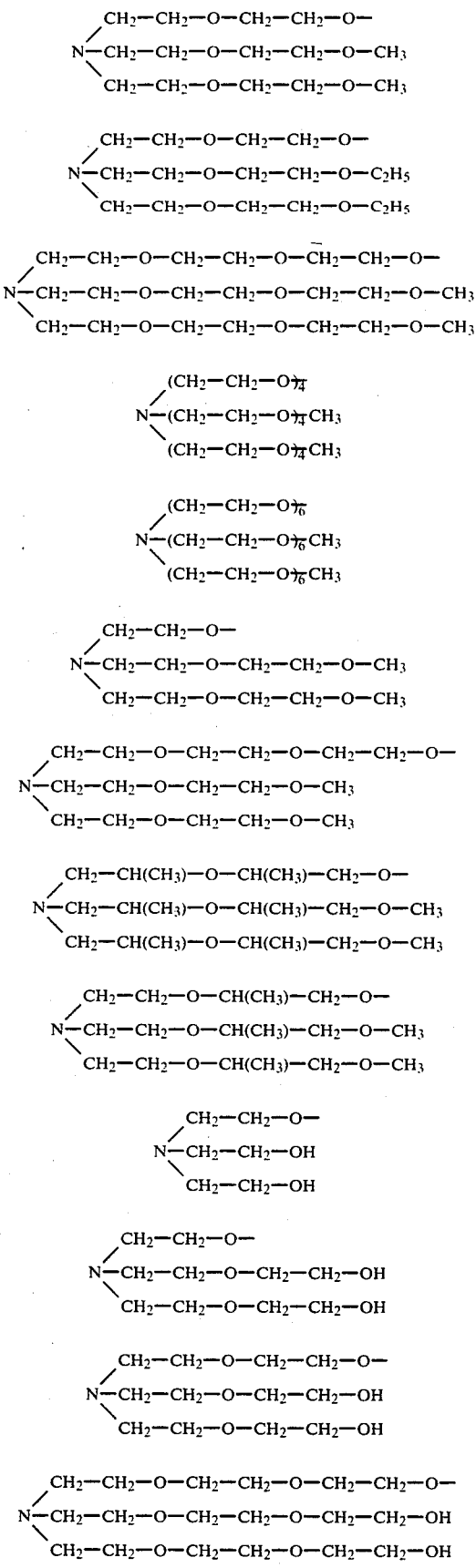

The substrate may be derived from any crosslinked organic polymer containing groups that can be substituted by the functional groups, recited above, which are preferably contained in a sequestering agent of formula (VII).

Examples of organic polymers that are suitable for the present invention include the polymers derived from vinylaromatic compounds, such as styrene and methylstyrene, and copolymers of vinlyaromatic compounds with $C_4$–$C_6$ conjugated dienes, such as styrene/butadiene and styrene/isoprene copolymers.

The use of polystyrene as the organic polymer is particularly preferred. When the organic polymer is polystyrene, the crosslinking agent is preferably divinylbenzene. The degree of crosslinking is an important factor. The functional groups of formula (II) that are grafted onto the polystyrene must, in fact, be active. To realize this, the molecules of the solvent in which the supported sequestering agent is to be employed in the applications which are described in detail hereinafter, must enter the interior of the polymer. To this end, the degree of crosslinking must not be so high as to impede the entry of the solvent and of the reactants. It is preferable to use a polystyrene in which the degree of crosslinking by divinylbenzene is less than approximately 10%. Still more preferably, the degree of crosslinking is less than approximately 5%.

The replaceable group is preferably chlorine or bromine in the chloromethyl radical (—$CH_2Cl$) or bromomethyl radical (—$CH_2Br$) attached to the polystyrene benzene nucleus.

It is especially preferable that the percentage of the polystyrene benzene nuclei bearing a functional group be greater than 5%. Still more preferably, this percentage is greater than 10%.

The preferred supported sequestering agents may be represented by the following formula:

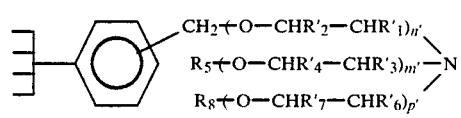

The sequestering agents of formula (VI) employed in the catalyst system of the invention are well-known products which are described, in particular, in French Pat. No. 1,302,365 and 2,450,120.

According to a second particular embodiment of the invention, the complexing compound is a macrocyclic polyether containing from 15 to 30 atoms in the ring and consisting of 4 to 10 units —O—X in which X is either —$CHR_6$—$CHR_7$ or —$CHR_6$—$CHR_8$—$CR_9R_7$. The $R_6$, $R_7$, $R_8$ and $R_9$, which are identical or different, may be a hydrogen atom or an alkyl radical containing from 1 to 4 carbon atoms. One of the X units may be —$CHR_6$—$CHR_8$—$CR_9R_7$—when the —O—X units comprise the group —O—$CHR_6$—$CHR_7$.

According to a third particular embodiment of the invention, the complexing compound is macrocyclic or bicyclic compound of general formula VIIIa or VIIIb in which:

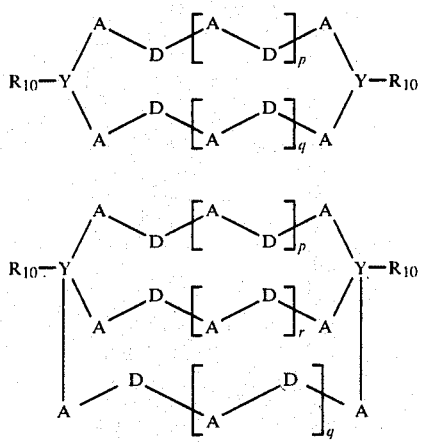

(VIIIa)

(VIIIb)

In Formulae VIIIa and VIIIb,
Y denotes N or P;
A denotes an alkylene group containing from 1 to 3 carbon atoms;
D denotes O, S or N—$R_{11}$, where $R_{11}$ denotes an alkyl radical containing from 1 to 6 carbon atoms;
$R_{10}$ denotes an alkyl radical containing from 1 to 6 carbon atoms; and
p, q and r, which are identical or different, are integers from 1 to 5.

According to a fourth particular embodiment of the invention, a mixture of at least two of the complexing compounds defined above is used.

According to a fifth particular embodiment of the invention, sequestering agents, macrocyclic polyethers (also known as crown ethers) and macrocyclic or bicyclic compounds (also known as cryptands) grafted onto crosslinked organic polymer substrates are used as a complexing compound. These grafted complexing compounds are especially those described in European Patent Application No. 460,706 that concerns grafted agents, and in the paper in Angew. Chem. Int. Ed. Engl. 18, 421–429 (1979) that relate to crown ethers or grafted cryptands.

The macrocyclic polyethers which can be used in the process according to the invention are known under the general name of crown ethers. These macrocyclic polyethers are described in French Patent Application No. 69/43,879 published under French Pat. No. 2,026,481.

The following may be mentioned as examples of crown ethers which can be used according to the invention:

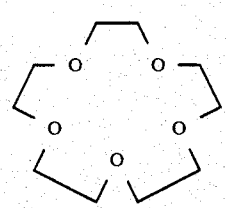

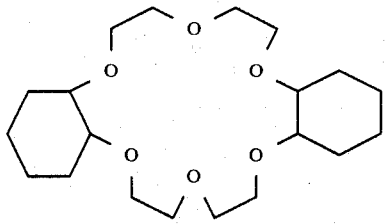

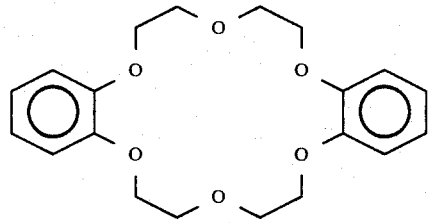

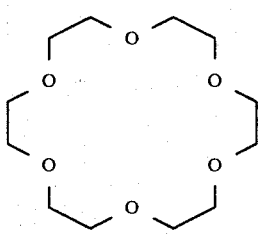

The macrocyclic and bicyclic compounds are described in French Patent Application No. 70/21,079 published under French Pat. No. 2,052,947. The following may be mentioned as examples of such compounds involved in the use of the process according to the invention:

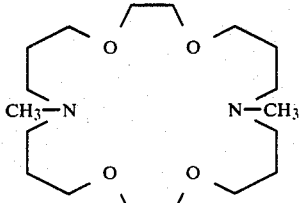

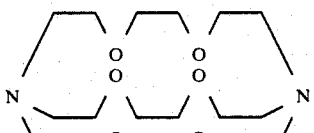

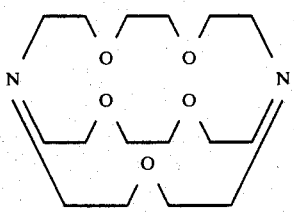

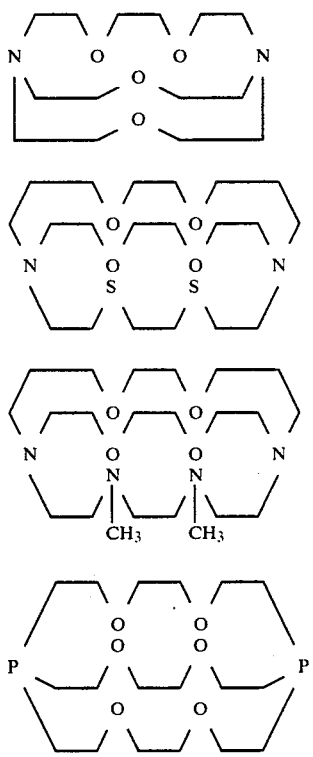

The process according to the invention may be used in the presence of a solvent or in bulk. In the latter case, the starting organopolysilazane acts as the solvent. When an additional solvent is used, the latter must meet a number of conditions: it must dissolve the starting organopolysilazane and be chemically inert towards the organopolysilazanes that are added or formed. A solvent such as, for example, benzene, toluene, cyclohexane, heptane, tetrahydrofuran, dioxane and isopropyl ether is preferably chosen.

The most suitable complexing agent for use in the process according to the invention is selected by taking into account the size of the cation in the ionic inorganic salt. The greater the cation size, the greater is the number of oxygen atoms present in the molecule of the complexing compound.

The process according to the invention may be used at a temperature between ambient temperature (20° C.) and approximately 200° C. Preferably, the temperature is between 30° C. and 150° C. for a period that is generally between 1 min and 24 h.

The operation is preferably carried out at atmospheric pressure under an inert atmosphere. Naturally, pressures which are higher or lower than atmospheric pressure are not excluded.

The complexing compound is used in a quantity such that the molar ratio of the complexing agent to the ionic inorganic salt is preferably between 0.05 and 20. Still more preferably, this ratio is between 0.10 and 2.

The catalyst system according to the invention is preferably used in concentrations of between 0.01 g and 5 g of ionic inorganic salt per kg of starting organopolysilazane. The complexing compound is preferably used in a concentration of from 0.001 g to 20 g per kg of starting organopolysilazane.

In a wholly unexpected manner, the treatment process according to the invention makes it possible to incorporate volatiles into the macromolecules of the aminolysate and also to rearrange and supercrosslink the aminolysate lattice in the presence of trifunctional silicon-containing units, for example $T_N$. As a result, the aminolysate lattice is more stable thermally during pyrolysis. Thus, depending on the nature of the starting aminolysate, the catalytic treatment of the invention produces a polymerization, a copolymerization, or a molecular rearrangement.

Another highly important advantage stemming from the catalytic treatment according to the invention is the formation of a treated aminolysate that has improved resistance to oxygen and to atmospheric moisture.

The process of the invention may be carried out with various polysilazanes that are used by themselves or mixed, for example, with organopoly(disilyl)silazanes or organopolysilazanes of various kinds. Thus, in particular, it is possible to carry out:

a polymerization of the aminolysate of $(CH_3)_2SiCl_2$;

a polymerization of the aminolysate of $(CH_3)_2ClSiSiCl(CH_3)_2$;

a copolymerization of an aminolysate of $(CH_3)_2SiCl_2$ and of the aminolysate of $CH_3SiCl_3$;

a rearrangement of a polydimethylsilazane in the presence of an aminolysate of $CH_3SiCl_3$;

a rearrangement of a coaminolysate of $(CH_3)_2SiCl_2$ and of $CH_3SiCl_3$; and a rearrangement of a coaminolysate of $(CH_3)_2SiCl_2$ and of $(CH_3)_{3-b}Cl_bSiSiCl_c(CH_3)_{3-c}$, with b and c as defined above as in formula (V) and b+c being greater than 2.

In the coating, film and thin layer applications, the treated organopolysilazane composition according to the invention is preferably used without a solvent. In this case, a viscosity of between 10 mPa s and 5000 mPa s at 25° C., preferably between 100 mPa s and 1000 mPa s, is chosen.

Higher viscosities may be used but, when the compositions are to be used to coat or impregnate a substrate, the composition then needs to be dissolved in an organic solvent that is compatible with the polysilazanes. Such organic solvents include benzene, toluene, hexane, cyclohexane, isopropyl ether, ethyl ether, dichloromethane and chlorobenzene.

Viscosities greater than 5000 mPa s at 25° C. must be used in fiber applications. These operations may be carried out without solvent, in the molten state or in solution. The crosslinking is produced at the die exit by a passage through an oven and/or under irradiation, such as UV, or electron beams.

The polysilazane compositions according to the invention may additionally contain fillers. These fillers are chosen, preferably, from $SiO_2$, $Si_3N_4$, $SiC$, $BN$, $B_2O_3$, $B_4C$, $AlN$, $Al_2O_3$, $Al_4C_3$, $TiN$, $TiO_2$, $TiC$, $ZrO_2$, $ZrC$, $VO_2$, and the like.

In addition, the polysilazane composition according to the invention may be used as a matrix for ceramic fibers made, in particular, of $SiC$, $SiO_2$, $Si_3N_4$, $B_4C$ and the like.

The polysilazane composition according to the invention is especially useful for coating or impregnating rigid or flexible substrates made of metal or of ceramic fibers.

The substrates that are covered or impregnated with the cured composition or the fibers may be immediately or subsequently subjected to a pyrolysis treatment. Preferably, this pyrolysis treatment is conducted under vacuum, pressure, or an inert atmosphere with a temperature rise ranging from the crosslinking temperature to 1500° C.-2000° C. depending on the required nature of the ceramic or of the binder.

The composition according to the invention consequently makes it possible to produce intermediate semi-finished products that can be stored in the open air and subsequently pyrolyzed.

As a result, the present invention constitutes a particularly advantageous process for depositing or impregnating a ceramic material onto a substrate, and for obtaining ceramic fibers and sintering binders.

In the following examples, which illustrate the invention without limiting its scope, the polysilazanes obtained, whether treated catalytically or not, are analyzed by thermogravimetric analysis (TGA). The polysilazanes are pyrolyzed at temperatures ranging from ambient temperature (20° C.) to 1400° C. under nitrogen at a rate of temperature rise of 2° C./min. The TGA yield (% by weight of solid residue at 1300°-1500° C.) is indicated in the examples.

In the examples, the viscosity is measured at 25° C. and is given in mPa s. In addition, in the formulae, Me=CH$_3$ and Vi=CH$_2$=CH. The ammonolysis and coammonolysis reactions are carried out in a first, three-liter cylindrical reactor I, which is equipped with a jacket for cooling the reaction space. A gas condenser is mounted above the reactor. Mechanical stirring is provided by two Rushton$^R$ turbines arranged along the stirrer shaft. One turbine has straight blades, and one turbine has inclined blades.

N$_2$ and NH$_3$ gases are introduced by means of a narrow tube immersed in the solution so that NH$_3$ is produced just below the first turbine stirrer. When ammonolysis is complete, the reaction mixture is drained off and is introduced into a second reactor II equipped with mechanical stirring (a Rushton ® turbine with straight blades) and a filter bed having a mean porosity 10 um.

The ammonolysates are filtered. The solvent washes are then introduced into a third, six-liter reactor III equipped with a jacket and mechanical stirring, by means of a straight-bladed Rushton ® turbine, and blanketed with N$_2$ or evacuated to 25 mbar, in which the catalytic treatment is carried out.

The entire unit is filled with an inert atmosphere several hours before the handling. The entire reaction, ammonolysis, filtration, and solvent evaporation takes place under dry nitrogen. The products obtained are placed in leakproof flasks blanketed with nitrogen and are stored, weighed and handled in a nitrogen-blanketed glove box.

The following are illustrated examples of the present invention. It is understood, however, that the invention is not to be limited to the specific conditions or details set forth in these examples, except insofar as such limitations are specified in the claims.

EXAMPLE 1

258 g of Me$_2$SiCl$_2$ (2 moles) of a purity which is greater than 99% are introduced into reactor I in the presence of 1.3 liters of dry isopropyl ether. Ammonia is introduced into reactor I at a rate of 10 cm$^3$/s for 6 h. The reaction temperature is maintained at 2° C. After NH$_4$Cl has been filtered off, 140 g of a cyclic polysilazane are recovered. After distillation at 188° C., D$_3^N$ dried over CaCl$_2$ is recovered.

EXAMPLE 2

2 moles of CH$_3$SiCl$_3$ (299 g) with a purity greater than 99% are ammonolysed in isopropyl ether at 2° C. Ammonia is introduced at a rate of 10 cm$^3$/s for 8 hours (i.e. approximately 12 moles of NH$_3$ committed). After removal of ammonium chloride and evaporation of the solvent under vacuum, a white solid is recovered that contains only trifunctional units, (T$_X^N$).

EXAMPLE 3

A coammonolysis is carried out. The following are introduced under dry nitrogen into reactor I: 0.72 mole of (CH$_3$)$_2$SiCl$_2$ (92.5 g) and 0.72 mole of CH$_3$SiCl$_3$ (107.2 g), in the presence of 1.1 liters of isopropyl ether.

The mixture is maintained at ambient temperature during the introduction of gaseour NH$_3$ in a slightly exothermic reaction. The rate of addition of NH$_3$ is maintained at approximately 6 ml/s of gas with the addition taking place over 6 h.

Large quantities of ammonium chloride are formed during the test, causing the solution to become viscous. When the test is complete, NH$_4$Cl formed is filtered in the reactor II on sintered glass having a mean pore of diameter 10 μm. The precipitate is washed several times with dry solvent. The solution recovered is clear. The solvent is evaporated off under vacuum (25 mbar at 75° C.) and the last traces of solvent are removed at 70° C. at 2 mbar.

The characteristics of the products are shown in Table I below.

TABLE 1

| Ammonolysis T (°C.) | Solvent | (CH$_3$)$_2$SiCl$_2$ Mol % | CH$_3$SiCl$_3$ Mol % | Yield coammonolysis, % |
|---|---|---|---|---|
| 21° C. | Iso ether | 50 | 50 | 92.3 |
| Viscosity mPa s | % D$^{N*}$ | % T$^{N*}$ | Yield % | TGA % | $\frac{PY \times TGA}{100}$ |
| 90 | 49 | 51 | 53 | 65 | 33 |

*Determined by $^{29}$Si NMR

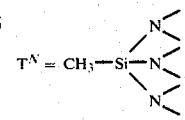

$$T^N = CH_3-Si\begin{matrix}N\\N\\N\end{matrix}$$

EXAMPLE 4

A mixture of the ammonolysates of Examples 1 and 2 is introduced into reactor III in such a quantity that the required molar percentages of D$^N$ and T$^N$ units are present in the ammonolysate mixture.

Copolymerization is rapid and leads to the formation of a crosslinked polysilazane, the pyrolysis of which produces an overall yield of ceramic (PY×TGA yield/100) greater than that of the ammonolysate of only MeSiCl$_3$ (20) or of only (CH$_3$)$_2$SiCl$_2$ (zero).

The polymer yield (PY) is measured by adding approximately 2 g of product exactly under dry N$_2$ to a breaker that is heated to 175° C. for 2 h under a vacuum of 1.3 millibar (mbar). After cooling, the beaker is weighed to measure the weight yield of polymer. The results, utilizing a catalyst system of KF and THA, are presented in Table II below.

TABLE II

| Example | D$^N$ mol % | T$^N$ mol % | Catalyst | Catalyst concentration g kg$^{-1}$ | T °C. | Time | PY % | TGA % | $\frac{PY \times TGA}{100}$ |
|---|---|---|---|---|---|---|---|---|---|
| 4 | 70 | 30 | KF + THA* | 3 16 | 110 | 2 h 30 min | 56 | 58 | 33 |

*tris(3-oxa-5-hydroxypentyl)amine

EXAMPLES 5, 6 AND COMPARATIVE EXAMPLES 7C AND 8C

The coammonolysate obtained in Example 3 is subjected to catalytic treatment in reactor III. The conditions of this treatment and the characteristics produced are presented in Table III below.

In comparative Example 7C, no catalyst is added and no heating takes place. In comparative Example 8C, no catalyst is added and the temperature is 110° C.

It can be seen from these examples that the catalytic treatment of the present invention significantly increases the yield of ceramic.

| Example | Catalyst | Catalyst concentration g kg$^{-1}$ | T °C. | Time | PY % | TGA % | $\frac{PY \times TGA}{100}$ |
|---|---|---|---|---|---|---|---|
| 5 | KF + THA* | 1.2 6.5 | 110 | 2 h | 79 | 55 | 44 |
| 6 | KF + TDA** | 1.9 10 | 140 | 1 h | 72 | 62 | 45 |
| 7C | — | — | — | — | 53 | 65 | 34 |
| 8C | — | — | 110 | 2 h | 64 | 49 | 30 |

*tris(3-oxa-5-hydroxypentyl)amine
**tris(3.6-dioxaheptyl)amine

While particular embodiments of the invention have been described, it will be understood that the invention is not so limited since many modifications and variations could be made without departing from the spirit or scope of the invention.

What is claimed is:

1. A process for the treatment of a polysilazane comprising the step of
catalytically treating at least one polysilazane selected from the group consisting of an organopolysilazane, an organopoly(disilyl)silazane, and a mixture thereof, with a catalytically effective amount of a catalyst system, the polysilazane being free from any hydrogen atoms bonded directly to the silicon atoms and wherein the organic radicals bonded to the silicon atoms in the polysilazane are hydrocarbon radicals,
the catalyst system comprising (i) an ionic inorganic salt of a formula M$^+$ A$^-$ wherein M$^+$ is selected from the group consisting of a metal ion and a quaternary ammonium compound, and A$^-$ is an anion compatible with M$^+$, and (ii) a compound capable of complexing with the M$^+$ cation.

2. The process according to claim 1, wherein the treatment is carried out in bulk.

3. The process according to claim 1, wherein the treatment is carried out in an organic solvent 4. The process according to claim 1, wherein M$^+$ is selected from the group consisting of an alkali metal, an alkaline-earth metal, and a quaternary ammonium ion.

5. The process according to claim 1, wherein A$^-$ is selected from the group consisting of a halogen, SCN$^-$, CN$^-$ and CO$_3$—.

6. The process according to claim 1, wherein M$^+$ is selected from the group consisting of Li$^+$, Na$^+$, K$^+$, Ca$^{++}$, and NH$_4^+$.

7. The process according to claim 6, wherein A$^-$ is selected from the group consisting of a halogen, SCN$^-$, CN$^-$, and CO$_3^-$.

8. The process according to claim 1, wherein the compound in the catalyst system that complexes with the M$^+$ cation is a sequestering agent of formula VI:

$$N-CHR_1-CHR_2-O-(CHR_3-CHR_4-O)_nR_5]_3 \quad (VI)$$

wherein n is an integer from 0 to 10 inclusive; $R_1$, $R_2$, $R_3$ and $R_4$, which is identical or different, are selected from the group consisting of a hydrogen atom and a $C_1-C_4$-alkyl radical; and R5, which are identical or different, is selected from the group consisting of a hydrogen atom, a $C_1-C_{12}$-alkyl radical, a $C_1-C_{12}$ cycloalkyl radical, an alkylphenyl radical, and a phenylalkyl radical, the alkyl moiety in the alkylphenyl and phenylalkyl radicals being $C_1-C_{12}$.

9. The process according to claim 8, wherein $R_1$, $R_2$, $R_3$ and $R_4$ in Formula VI, which may be the same or different, are selected from the group consisting of a hydrogen atom and a methyl radical; and at least one $R_5$ radical is selected from the group consisting of a hydrogen atom and a $C_1-C_4$ alkyl radical.

10. The process according to claim 8, wherein n is an integer from 0 to 6.

11. The process according to claim 8, wherein n is an integer from 0 to 3.

12. The proces according to claim 1, wherein the compound in the catalyst system that complexes with the M$^+$cation is a grafted sequestering agent of Formula VII:

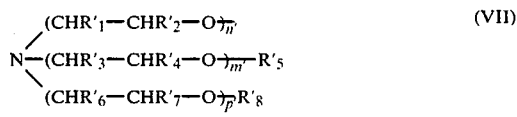

wherein R'$_1$, R'$_2$, R'$_3$, R'$_4$, R'$_6$ and R'$_7$, which are identical or different, are chosen from a hydrogen atom and an alkyl radical containing from 1 to 4 carbon atoms; R'$_5$ and R'$_8$, which are identical or different, are chosen from a hydrogen atom, an alkyl or cycloalkyl radical containing from 1 to 12 carbon atoms, a phenyl radical, and an alkylphenyl or phenylalkyl radical in which the alkyl moiety consists of $C_1-C_{12}$; and n', m' and p', which are identical or different, are greater than or equal to 1 and less than or equal to 10, the grafted sequestering agent of Formula VII being grafted through the terminal —O— of said +CHR'$_1$—CHR'$_2$—O+$_{n'}$ portion of Formula VII to a crosslinked polymer substrate.

13. The process according to claim 12, wherein R'$_1$, R'$_2$, R'$_3$, R'$_4$, R'$_5$, R'$_6$, and R'$_7$ in Formula VII, which may be the same of different, are selected from the group consisting of a hydrogen atom and a methyl radical; and R'$_5$ and R'$_8$ in Formula VII, which may be the same or different, are selected from the group consisting of a hydrogen atom and a C$_1$-C$_4$ alkyl radical.

14. The process according to claim 12, wherein n', m', and p' in Formula VII, which may be the same or different, are greater than or equal to 1 and less than or equal to 6.

15. The process according to claim 1, wherein the compound complexing with a M$^+$cation is a macrocyclic polyether containing from 15 to 30 atoms in the ring and 4 to 10 —O—X units, X being selected from the group consisting of —CHR$_6$—CHR$_7$— and —CHR$_6$—CHR$_8$—CR$_9$R$_7$—, wherein R$_6$, R$_7$, R$_8$ and R$_9$, which are identical or different, are selected from the group consisting of a hydrogen atom and an alkyl radical containing from 1 to 4 carbon atoms.

16. The process according to claim 15, wherein at least one of the X substituents is —CHR$_6$—CHR$_8$—CR$_9$R$_7$— when at least one of the —O—X units is —O—CHR$_6$—CHR$_7$—.

17. The process according to claim 1, wherein the complexing compound is a compound selected from the group consisting of macrocyclic compounds of the formula VIIIa and bicyclic compounds of the formula VIIIb:

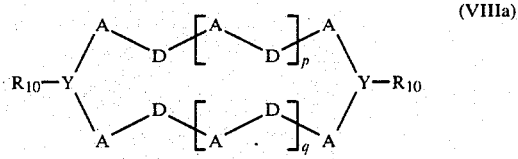
(VIIIa)

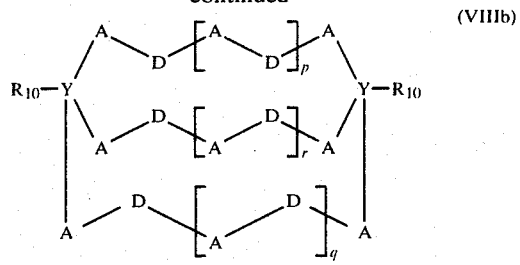
(VIIIb)

wherein
Y denotes N or P;
A denotes an alkylene group containing from 1 to 3 carbon atoms;
D denotes 0, S or N—R$_{11}$ wherein R$_{11}$ denotes an alkyl radical containing from 1 to 6 carbon atoms;
R$_{10}$ denotes an alkyl radical containing from 1 to 6 carbon atoms; and
p, q and r, which are identical or different, are integers from 1 to 5.

18. The process according to claim 17, wherein the macrocyclic compound or the bi-cyclic compound is grafted onto a cross linked organic substrate.

19. The process according to claim 1, wherein the complexing compound is grafted onto a crosslinked organic substrate.

20. The process according to claim 1, wherein the ionic inorganic salt is used in a concentration of from 0.01g to 5 g of salt per kg of polysilazane.

21. The process according to claim 1, wherein the complexing agent is used in a concentration of from 0.001g to 20 g per kg of polysilazane.

22. The process according to claim 1, wherein the complexing compound is used in a quantity such that the molar ratio of the complexing compound to the ionic inorganic salt is from 0.05 to 20.

23. The process according to claim 22, wherein said molar ratio is from 0.10 to 2.

24. The process according to claim 1, wherein the catalytic treatment is carried out at a temperature from 20° to 200° C.

25. The process according to claim 1, wherein said inorganic salt is KF and said complexing agent is selected from the group consisting of tris(3-oxa-5-hydroxy-penty) amine and tris(3,6-dioxaheptyl)amine.

* * * * *